United States Patent [19]
Kim

[11] Patent Number: 6,029,208
[45] Date of Patent: Feb. 22, 2000

[54] SYSTEM FOR GENERATING BLOCK ADDRESS BY REPLACING SECOND COUNT WITH SECOND VALID BLOCK ADDRESS WHENEVER SYNC IS DETECTED OR SYMBOL COUNT IS REACHED IN ONE COMPLETE BLOCK

[75] Inventor: Young-chul Kim, Seoul, Rep. of Korea

[73] Assignee: Samsung Electronics Co., Ltd., Kyungki-do, Rep. of Korea

[21] Appl. No.: 08/947,848

[22] Filed: Oct. 9, 1997

[30] Foreign Application Priority Data

| Oct. 9, 1996 | [KR] | Rep. of Korea | 96-44922 |
| Oct. 9, 1996 | [KR] | Rep. of Korea | 96-44923 |
| Feb. 12, 1997 | [KR] | Rep. of Korea | 97-4125 |

[51] Int. Cl.[7] ............................ G06F 13/38; G06F 11/00
[52] U.S. Cl. ......................... 710/4; 371/47.1; 371/37.01
[58] Field of Search ............................. 371/47.1, 37.01, 371/40.13; 360/32.39, 51; 395/824; 710/4

[56] References Cited

U.S. PATENT DOCUMENTS

| 4,525,754 | 6/1985 | Handley ..................................... 360/51 |
| 4,532,561 | 7/1985 | Kimura et al. ........................ 360/73.01 |
| 4,796,243 | 1/1989 | Kato ............................................. 386/91 |
| 4,819,090 | 4/1989 | Hikawa ...................................... 360/32 |
| 4,879,731 | 11/1989 | Brush ....................................... 375/368 |
| 5,202,890 | 4/1993 | Iketani et al. .......................... 371/40.3 |
| 5,222,001 | 6/1993 | Tokumatsu et al. ...................... 360/32 |
| 5,228,041 | 7/1993 | Yoshino et al. ........................ 371/47.1 |
| 5,761,249 | 6/1998 | Ben-Efraim ............................. 375/341 |

*Primary Examiner*—Thomas C. Lee
*Assistant Examiner*—Ilwoo Park
*Attorney, Agent, or Firm*—Skjerven, Morrill, MacPherson, Franklin & Friel LLP; David T. Millers

[57] ABSTRACT

For serially transmitted block data that includes a sync signal, ID code, block address code, error correction code, and object data, a data receiving apparatus uses an input data reader that detects the sync signal, checks for parity errors and stores the block address, a sync signal generator that creates an effective sync signal in case the actual signal is not detected, and a block address output generator which provides the appropriate block address for data storage in memory. For data that includes only a sync signal and object data, a receiving apparatus uses a sync signal detector to detect the incoming sync signal, a sync signal generator to create an effective sync signal, a controller and sync signal selector to choose the appropriate signal, and block address and writing address counters to generate addresses for data storage in memory. In both implementations, the normal redundancy of the effective sync signals prevents data from being lost due to undetected sync signals and also minimizes unused memory storage areas in the case of discontinuous incoming block addresses (i.e. track jump). For serial data without a sync signal but having a predetermined number of bytes in every block, an apparatus uses a sync signal generator which detects the block dividing signal between data blocks, a latch signal generator and data latch which capture the transmitted data and convert it to parallel data, and an address generator which generates the memory storage addresses for the parallel data.

11 Claims, 8 Drawing Sheets

SYSTEM FOR GENERATING BLOCK ADDRESS BY REPLACING SECOND COUNT WITH SECOND VALID BLOCK ADDRESS WHENEVER SYNC IS DETECTED OR SYMBOL COUNT IS REACHED IN ONE COMPLETE BLOCK

BACKGROUND OF THE INVENTION

1. Field of the Invention

The present invention relates to a method and apparatus for receiving serial data, and more particularly, to a method and apparatus for receiving serial digital data even when a sync signal or a block address of the data is lost.

2. Description of the Related Arts

When serial data is stored in a recording medium or transmitted in units of one block, a sync signal is inserted at the head of each block to divide the serial data into blocks. The sync signal is desired to have a pattern which is not found in the source data so that the sync signal is correctly detected in a reproducing or receiving part.

However, when both analog video signals and digital video signals are recorded on a recording medium at the same time, the probability increases that the code pattern of the data used as the sync signal is duplicated in the source data, in turn increasing the probability of error due to erroneous sync signal detection. Lengthening the sync signal data may decrease the probability of error, but it also decreases the recordable frequency band and data transmission speed.

Figure 1A:
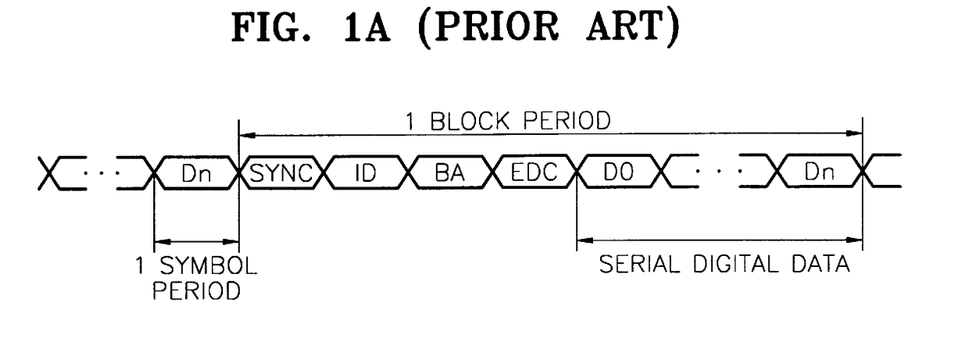
FIG. 1A shows a serially transmitted digital signal which includes a block address code by which parity can be checked.

FIG. 1A shows a typical format of one block of serially transmitted digital data. The depicted format includes a sync signal SYNC, an ID code ID, a block address code BA, an error correction code EDC, and serial digital data D0, . . . , Dn. ID code ID and block address code BA are included in addition to sync signal SYNC so that parity checking can be performed in order to decrease the probability of errors.

An apparatus for detecting a sync signal in data transmitted with such a format is disclosed in U.S. Pat. No. 5,228,041 issued Jul. 13, 1993 to Yoshino et al. and entitled "SYNC SIGNAL DETECTION SYSTEM IN A MEMORY SYSTEM FOR RECORDING AND REPRODUCING BLOCK UNIT DATA". In the apparatus of Yoshino et al., whenever a sync signal is detected, a block address is incremented or decremented. If the resultant value is identical to the transmitted block address, and if parity testing is performed using the ID code (ID) and the block address code (BA) indicates that the detected sync signal is correct, the value of the block address counter is output.

When the parity test for the ID code ID and the block address code BA is successful but the transmitted block address and the incremented block address are not identical (e.g. when one or more normal sync signals are not detected due to noise and the block address counter is not incremented), the transmitted block address is applied to the block address counting circuit and then output to adjust a memory address.

Generally, when serial data which is transmitted in block units with a sync signal, the following errors may take place. First, when the source data has a code pattern that is the same as that of the sync signal, a sync signal detection error may occur. Second, when the sync signal is lost or changed due to noise, the source data itself may be ignored.

While the first error can be cured by the apparatus of Yoshino et al., the second error can not. Specifically, the prior art has the problem of losing a transmitted data block when the associated sync signal can not be detected.

Meanwhile, even though the above-mentioned prior art makes it possible to decrease the probability of error in sync signal detection without increasing the length of the sync signal, the transmitted block data must always also include codes such as an identification code, a block address, and an error detecting code, so that parity can be checked. Thus, another problem with the prior art is that unused memory space may exist when a track jump occurs since the block address is used in detecting the sync signal.

The above-mentioned prior art has yet another problem in that a clock line for latching data is required in addition to a line for receiving the block data.

SUMMARY OF THE INVENTION

One object of the present invention is to provide a serial data receiving method for serial digital data transmitted in block units, each block having a block address code. When a sync signal is not detected, this method creates an effective block address by generating an effective sync signal.

Another object of the present invention is to provide an apparatus for performing the above serial data receiving method.

Another object of the present invention is to provide a serial data receiving method for serial digital data transmitted in block units, each block having a block address code. When a sync signal is not detected, the method creates an effective block address by generating an effective sync signal, and minimizes unused memory in the case of a track jump.

Another object of the present invention is to provide an apparatus for performing the above serial data receiving method.

Another object of the present invention is to provide a serial data receiving method that does not require a clock line or a parity code.

Another object of the present invention is to provide an apparatus for performing the above serial data receiving method.

Another object of the present invention is to provide a method for controlling storage of the transmitted serial data in memory in block units without a clock line or a parity code.

Another object of the present invention is to provide an apparatus for performing the above storage control method.

To achieve one of the above objects, a data processing apparatus for detecting a sync signal and recording object data from serially-transmitted block data that includes the sync signal, an ID code, a block address code, an error correction code and object data, comprises first and second signal generators, a clock signal generator, a counter, a block address latch, a parity tester, and a block address generator.

The first signal generator generates a first signal when the sync signal is detected in the serially-transmitted block data. The second signal generator counts the number of symbols of serially-transmitted data and generates a second signal when the counted number is equal to the number of symbols in one block of data. The clock signal generator generates a clock signal whenever the first or second signal is generated. The counter is reset when the first block data is input and increases or decreases its counted value by one whenever the clock signal is input. The block address latch latches the block address code from the current block data as a first block address, and latches the block address code from the previous block of data as a second block address. The parity tester examines the parities of the sync signal, the ID code and the block address code of the transmitted block data using the error correction code. The block address generator outputs the count value of the counter as a block address in memory. If the count value of the counter and the first block address latched in the block address latch are not identical, the block address from the subsequent data block is stored in the counter as the count value if in addition there are no parity errors and the difference between the block address from the subsequent data block and the first block address is equal to one.

To achieve another one of the above objects, a data processing apparatus for detecting a sync signal and recording object data from serially-transmitted block data that includes a sync signal and object data, comprises a sync signal detector, a byte clock pulse generator, a byte counter, a writing address counter, a sync signal selector, a block address counter, and a controller.

The sync signal detector generates a D_SYNC signal when a sync signal is detected in the input data. The byte clock pulse generator generates a byte clock pulse for each byte of the input data. The byte counter counts the byte clock pulses and generates an I_SYNC signal when the count of the byte clock pulses equals the predetermined number of bytes which comprise one block. The writing address counter counts the byte clock pulses starting from an initial writing address and generates a writing address value. The sync signal selector receives the D_SYNC signal and the I_SYNC signal and generates an A_SYNC signal by selecting either the D_SYNC or the I_SYNC signal according to a sync select enable signal. The block address counter increments based on the A_SYNC signal starting from an initial block address and generates a block address value. The A_SYNC signal also resets the byte counter and the writing address counter. The controller generates the sync select enable signal for the sync signal selector, the initial block address for the block address counter, and the initial writing address for the writing address counter.

To achieve yet another one of the above objects, a method for serially transferring blocks of data each including a predetermined number of bytes comprises the steps of transferring a block dividing signal (step 1), transferring all the bytes of data (step 2), and repeating the steps 1 and 2.

The block dividing signal for marking the division between blocks of data maintains a first logic level for a predetermined time section. The beginning signal maintains a second logic level which is the opposite of the first logic level for longer than the period of one bit of the data. The end signal maintains the first logic level for longer than the period of one bit of the data. In the step of transferring the bytes of data, all the bytes of data included in one block are transferred continuously and serially.

To achieve yet another one of the above objects, an apparatus for storing in memory the data transferred using a method including the steps of transferring a block dividing signal which marks the division between blocks of data (step 3), continuously transferring all the bytes of data included in one block, where each byte is composed of a beginning signal which announces the beginning of the byte, one byte of data, and an end signal which announces the end of the byte (step 4), and repeating the steps 3 and 4 on the next block of data, after one block of data has been transferred, comprises a sync signal generator, a latch signal generator, a data latch, and an address generator.

The sync signal generator generates a sync signal by detecting the block dividing signal in the transferred input data. The latch signal generator generates a latch signal for latching the input data according to the rate of data transfer, and is enabled by the sync signal generated by the sync signal generator. The data latch detects the beginning signal and the end signal from the input data latched according to the latch signal, latches all the data of one byte, and converts it into parallel data. The address generator generates an address according to the number of bytes of the transferred input data, for recording the parallel data in memory.

BRIEF DESCRIPTION OF THE DRAWINGS

The above objects and advantages of the present invention will become more apparent by describing in detail a preferred embodiment thereof with reference to the attached drawings in which.

DETAILED DESCRIPTION OF THE PREFERRED EMBODIMENTS

Figure 3:
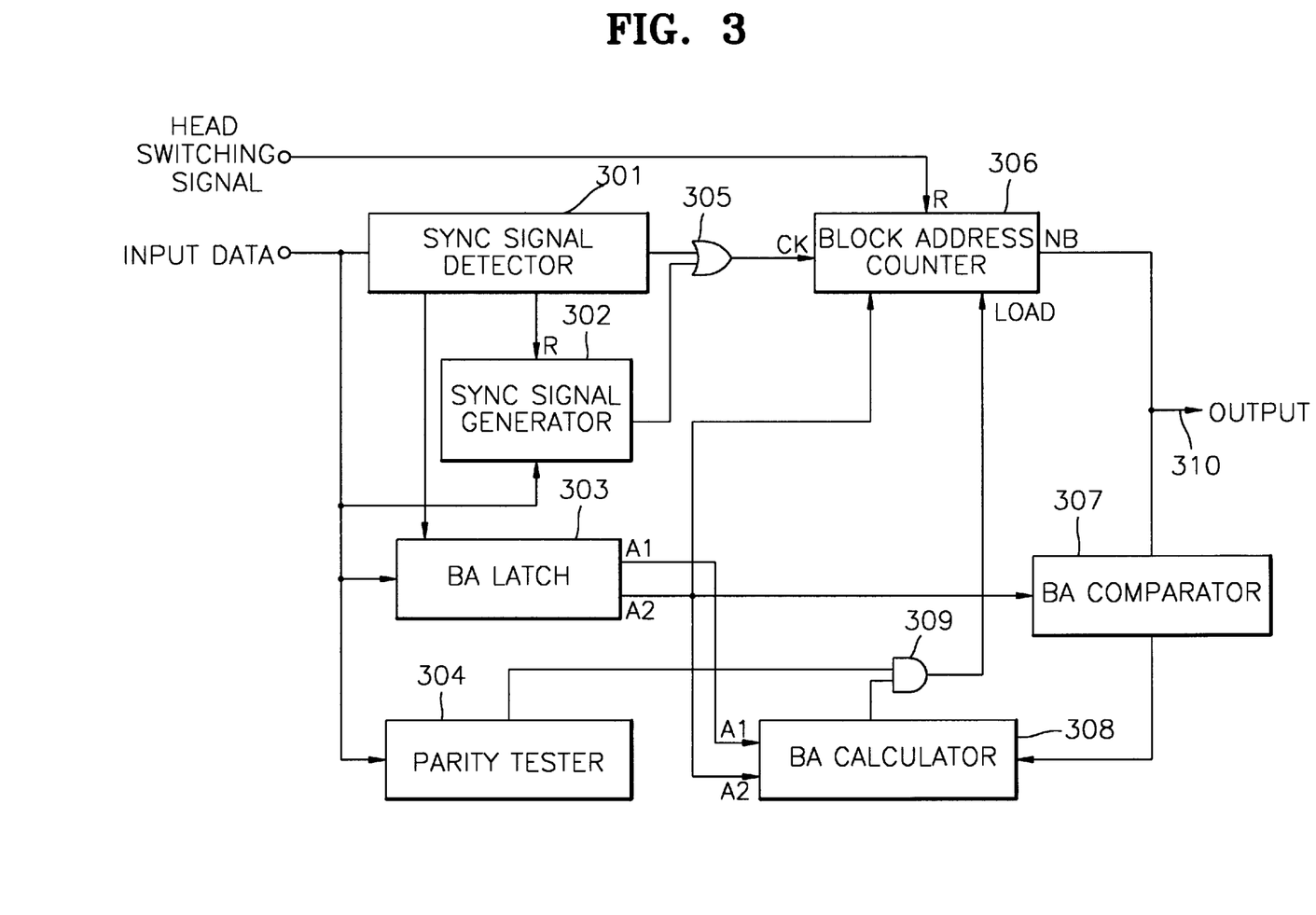
FIG. 3 shows an embodiment of the present invention for receiving serial data that includes a block address code by which parity can be checked.

An embodiment of the present invention shown in FIG. 3 is an apparatus for receiving serial data having the format shown in FIG. 1A.

A sync signal detector 301 monitors the input serial data and outputs a logic "high" when a sync signal is detected. At the same time, a sync signal generator 302 counts the number of symbols of transmitted serial data and generates a logic "high" when the number of symbols corresponding to a block is counted. Sync signal generator 302 is reset by either this generated signal or the sync signal output by sync signal detector 301. An OR gate 305 performs a logic OR operation on the signals from sync signal detector 301 and sync signal generator 302 to output a clock signal CK.

A block address counter 306, which is reset by a head-switching signal, upcounts in response to the clock signal output by OR gate 305, and outputs the counted value as a block address NB.

A block address latch 303 generates a block address by detecting a block address code from the transmitted block data and latching it as the current block address A2, Block address latch 303 provides the block address of the previously transmitted block data as A1.

A block address comparator 307 compares block address A2, output by block address latch 303, with block address NB, output by block address counter 306. If the addresses are not the same, block address comparator 307 sends an enable signal to a block address calculator 308.

Block address calculator 308 calculates the difference between block addresses A2 and A1 from block address latch 303, and asserts a logic "high" signal when the difference is equal to 1.

A parity tester 304 examines the parity of the transmitted serial data and asserts a logic "high" signal when there is no error in the parity test. An AND gate 309 receives the output of block address calculator 308 and the output of parity tester 304, and outputs a load signal LOAD to block address counter 306 when both signals are logic "high". When it receives load signal LOAD, block address counter 306 loads block address A2 from block address latch 303.

Problems that can occur during serial data transmission include the case in which a number of blocks of the serial data are skipped, the case in which noise disrupts the transmitted block address, and also the case in which noise disrupts the transmitted sync signal.

The operation in the above cases of an apparatus that is an embodiment of the present invention is as follows.

In the first two cases, when current block address A2 latched by block address latch 303 is not the same as block address NB output by block address counter 306, block address calculator 308 is enabled. When the next data block is received, the block address in A2 is moved to A1, and the new incoming block address is stored as A2. Block address calculator 308 calculates the difference between block addresses A2 and A1. If the difference does not equal one, this indicates that there was a problem with the received block address, and block address calculator 308 asserts a logic "low". If the difference is equal to 1, i.e. when the serially transmitted data had skipped more than one block and data transmission is continuing from the new location, block address calculator 308 asserts a logic "high". At the same time, parity tester 304 asserts a logic "high" signal to AND gate 309 if the parity of the current block is normal.

If AND gate 309 reads a logic "low" from block address calculator 308, the transmitted sync signal pattern is determined to have been corrupted or improperly received, so no changes are made to block address counter 306. However, if AND gate 309 receives a logic "high" from both block address calculator 308 and parity tester 304, the transmitted sync signal pattern is determined to be a normal sync signal pattern consistent with serial data that has skipped one or more blocks in its transmission. Thus, block address counter 306 receives the LOAD signal from AND gate 309, loads current block address A2, and then starts to upcount from newly loaded address A2. As a result, in either case block address counter 306 properly corresponds to the subsequent block addresses in the transmitted data.

In the rare instance where consecutive block addresses are damaged so that the difference between A2 and A1 accidentally becomes 1, it is possible for an incorrect block address to be loaded into block address counter 306. However, the transmitted block addresses are continually compared with counted block address NB by block address comparator 307, so normal operation is recovered after one block.

The other potential problem is the case in which noise corrupts a sync signal. When a normal sync signal of the transmitted block data is detected, sync signal detector 301 signals block address counter 306 to increase by one count. However if a sync signal of the transmitted block data is not detected, sync signal generator 302 will still provide an output at the appropriate point in order to cause block address counter 306 to upcount by one. Thus, even when a sync signal of the transmitted block data is damaged or not detected, a proper block address can be output, and the block data can be recorded in memory rather than being lost.

Figure 1B:
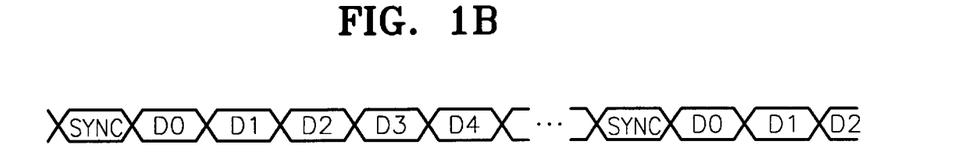
FIG. 1B shows a serially transmitted digital signal which does not include a block address code by which parity can be checked.
Figure 4:
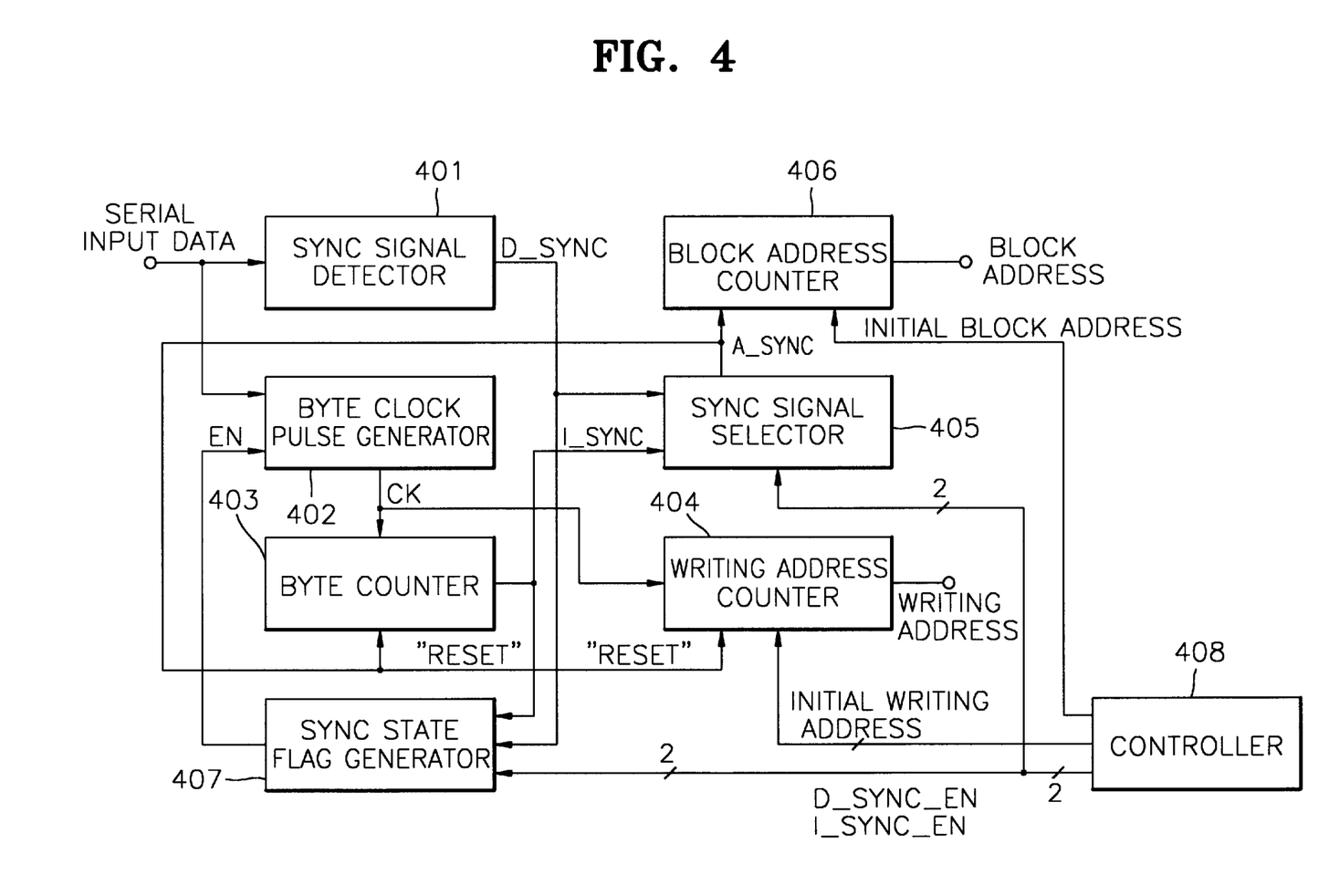
FIG. 4 shows an embodiment of the present invention for receiving serial data which does not include a code by which parity can be checked.

An embodiment of the present invention shown in FIG. 4 represents an apparatus for receiving serial data with the format shown in FIG. 1B.

A sync signal detector 401 detects a sync pattern included in input serial data and generates a detected sync signal D_SYNC.

A byte clock pulse generator 402 generates a pulse signal following the byte units of the input serial data, creating a byte clock pulse for counting the number of bytes.

A byte counter 403 counts the byte clock pulses and generates a pulse whenever the number of bytes of one complete block of the serial data is counted. An insert sync signal I_SYNC is generated when the counted value equals the value obtained by adding the number of bytes which form the sync signal and the number of bytes of the main data.

A writing address counter 404 counts the byte clock pulses output by byte clock generator 402 and outputs a writing address within the block address. The initial writing address value from which counting starts is designated by a controller 408.

A sync signal selector 405 receives detected sync signal D_SYNC from sync signal detector 401, and insert sync signal I_SYNC from byte counter 403, selects signal D_SYNC or signal I_SYNC according to the activation states of a detected sync enable signal D_SYNC_EN and an insert sync enable signal I_SYNC_EN output by controller 408, and generates an active sync signal A_SYNC.

A block address counter 406 counts in response to signal A_SYNC and outputs the block address to be stored. The initial block address value from which counting starts is designated by controller 408. Signal A_SYNC also resets byte counter 403 and writing address counter 404.

The activation or non-activation of signal D_SYNC_EN or signal I_SYNC_EN by controller 408 produces the following operations.

First, when both signal D_SYNC_EN and signal I_SYNC_EN are activated by controller 408, the following occurs.

Byte counter 403, reset by A_SYNC, counts each byte of the input data, and outputs signal I_SYNC after the number of bytes corresponding to one block have been read.

Figure 5A:
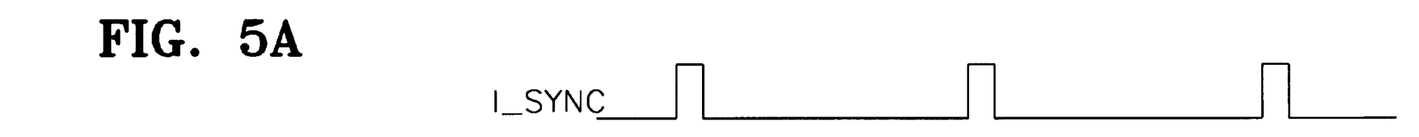
FIGS. 5A through 5D show the states of stored data in the case that the sync signal is not detected, for both the prior art and an embodiment of the present invention.
Figures 5B, 5C, 5D:
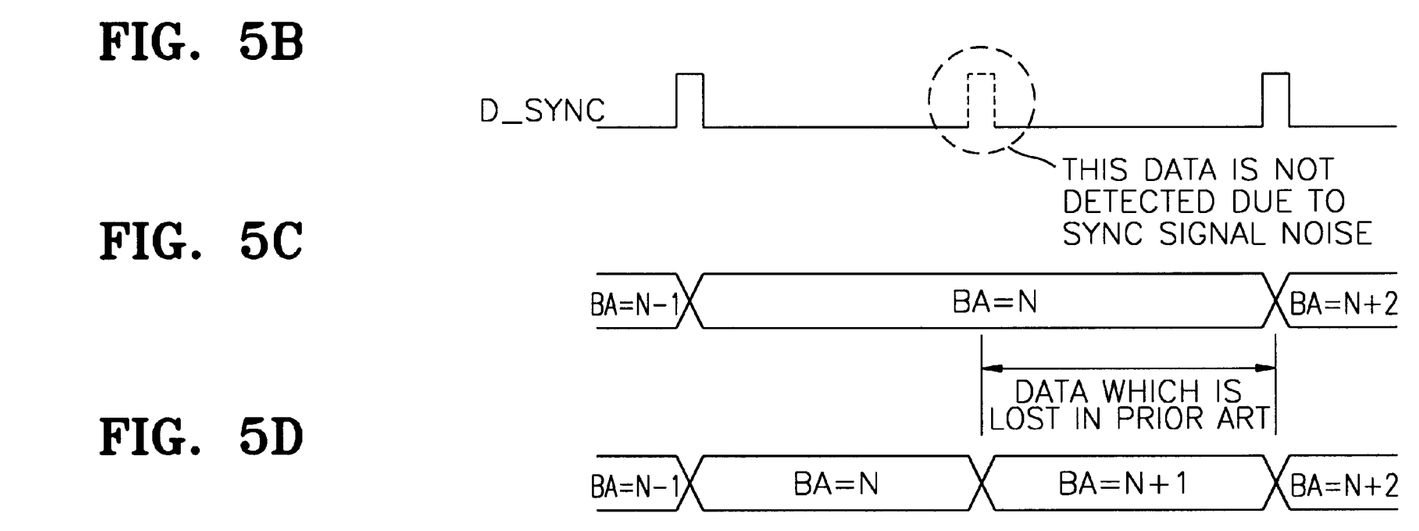

If signal I_SYNC is output as shown in FIG. 5A, and signal D_SYNC is not detected as shown in FIG. 5B, the indication is that the sync signal is not detected due to noise.

In the case that the sync signal is not detected due to noise, controller 408 activates signal I_SYNC_EN, and sync signal selector 405 selects signal I_SYNC in the period during which signal D_SYNC is not detected, and outputs it as signal A_SYNC. Therefore, block address counter 406 counts signal A_SYNC (equal to signal I_SYNC) while byte counter 403 is reset by signal A_SYNC.

In the prior art, data existing at block address (N+1) is lost as shown in FIG. 5C. However, according to the embodiment of the present invention, data existing at a block address (N+1) is stored in memory, as shown in FIG. 5D, because signal I_SYNC is generated by byte counter 403.

Figure 6A:
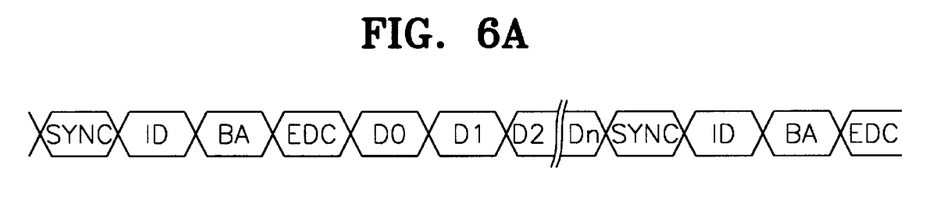
FIGS. 6A and 6B show the states of stored data in the prior art and the present invention when a track jump occurs.
Figure 6B:
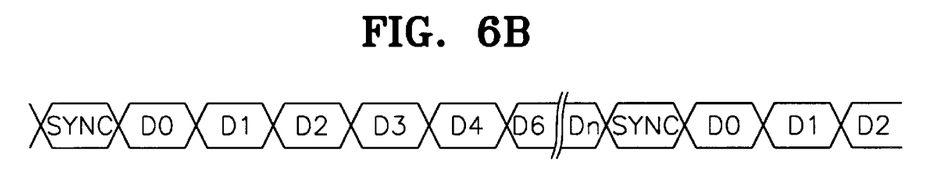
Figure 7:
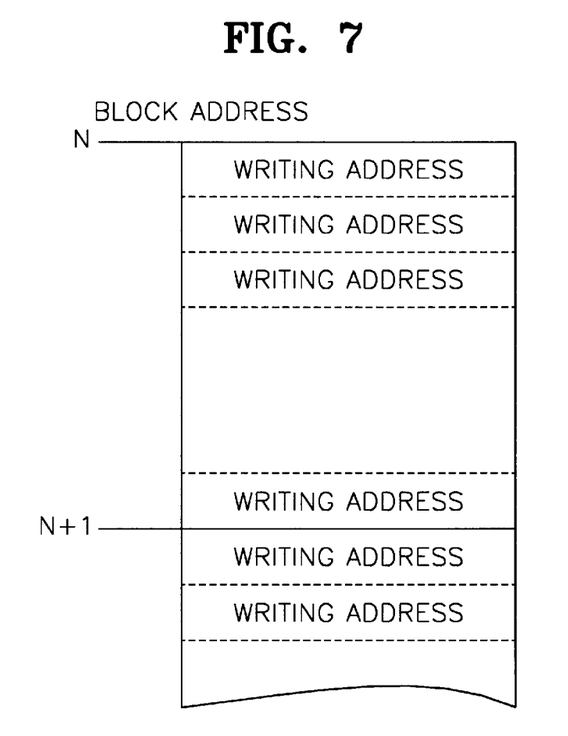
FIG. 7 shows the block address and the writing address of data stored in memory.

Meanwhile, if subsequently a proper signal D_SYNC is generated before the next time signal I_SYNC is generated, this indicates that a track jump has occurred. Signal D_SYNC resets both byte counter 403 and writing address counter 404, but does not cause sync signal selector 405 to increment block address counter 406, which is controlled by controller 408. This maintains the sequential increase of block addresses in memory, as shown in FIG. 7, whereas in the prior art, when track jump occurs the unused area in memory becomes larger by as much as the difference between the block addresses since the block address is included in the input data as shown in FIG. 6A.

Second, when only signal D_SYNC_EN is activated by controller 408, the operation is as follows.

The block address is incremented not by signal $I_{13}$ SYNC but by signal D_SYNC. Therefore, in the case of the track jump, if signal I_SYNC is generated, byte counter 403 and writing address counter 404 stop operating as a sync state flag generator 407 cancels the activation state of a signal for enabling byte clock pulse generator 402. The block address is incremented at the following signal D_SYNC.

Third, when only signal I_SYNC_EN is activated by controller 408, the block address is incremented according to only signal I_SYNC, regardless of signal D_SYNC, and byte counter 403 and writing address counter 404 are reset only by signal I_SYNC.

Contrary to the prior art, the present invention, by using signal I_SYNC, decreases the probability of error without increasing the length of the sync signal, prevents data from being lost when the sync signal goes undetected, and also minimizes unused memory areas since the block address increases sequentially even in the case of track jump.

An apparatus and method for processing serially transmitted data which does not include an additional sync signal, and for storing received data, will be described in detail.

Figure 1C:
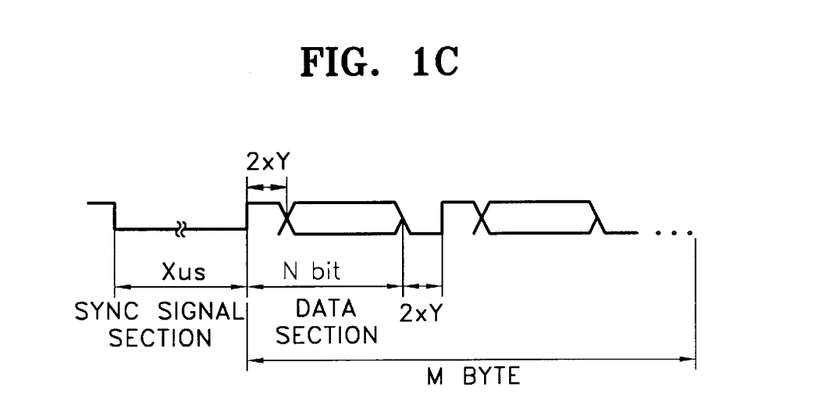
FIG. 1C shows transmitted data which does not have an additional sync signal.
Figure 2:
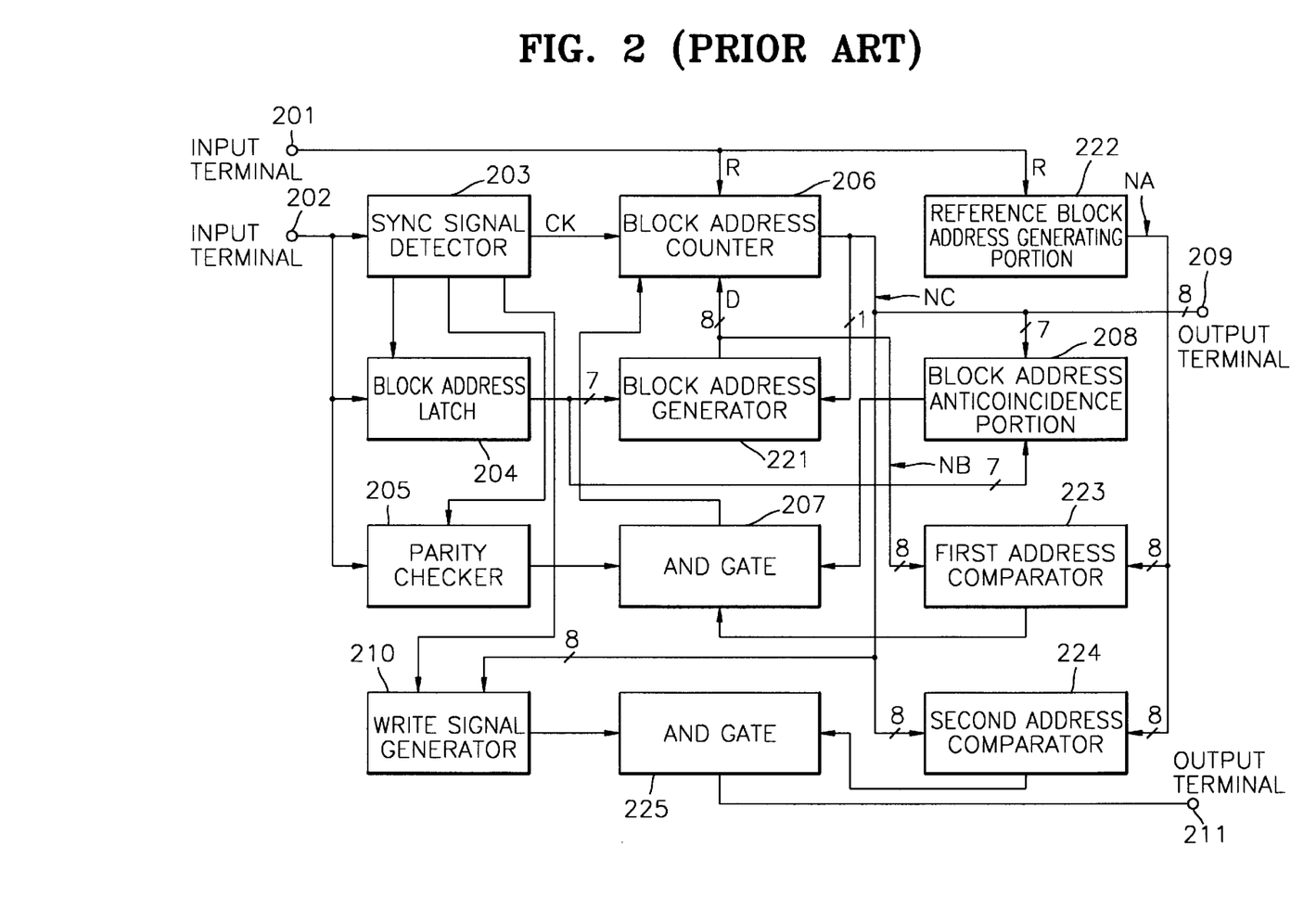
FIG. 2 shows an conventional apparatus for processing serial data.

Referring to FIG. 1C, the digital serial data of one transmitted block is composed of M bytes of data and each byte is constructed of N bits.

After transferring a block dividing signal for marking the division between data blocks, the subsequent data section proceeds with a start signal which indicates the beginning of one byte of the data section, followed by one byte of data constructed of N bits, and then a byte dividing signal for marking the division between data bytes. This cycle of start signal-N bit data section-dividing signal repeats until the M byte data section is completed. The block dividing signal maintains a logic "low" signal for a period of X $\mu$s, the start signal maintains a logic "high" signal for the period (2*Y $\mu$s) of one data bit, and the byte dividing signal maintains a logic "low" signal for the period (2*Y $\mu$s) of one data bit.

Figure 8:
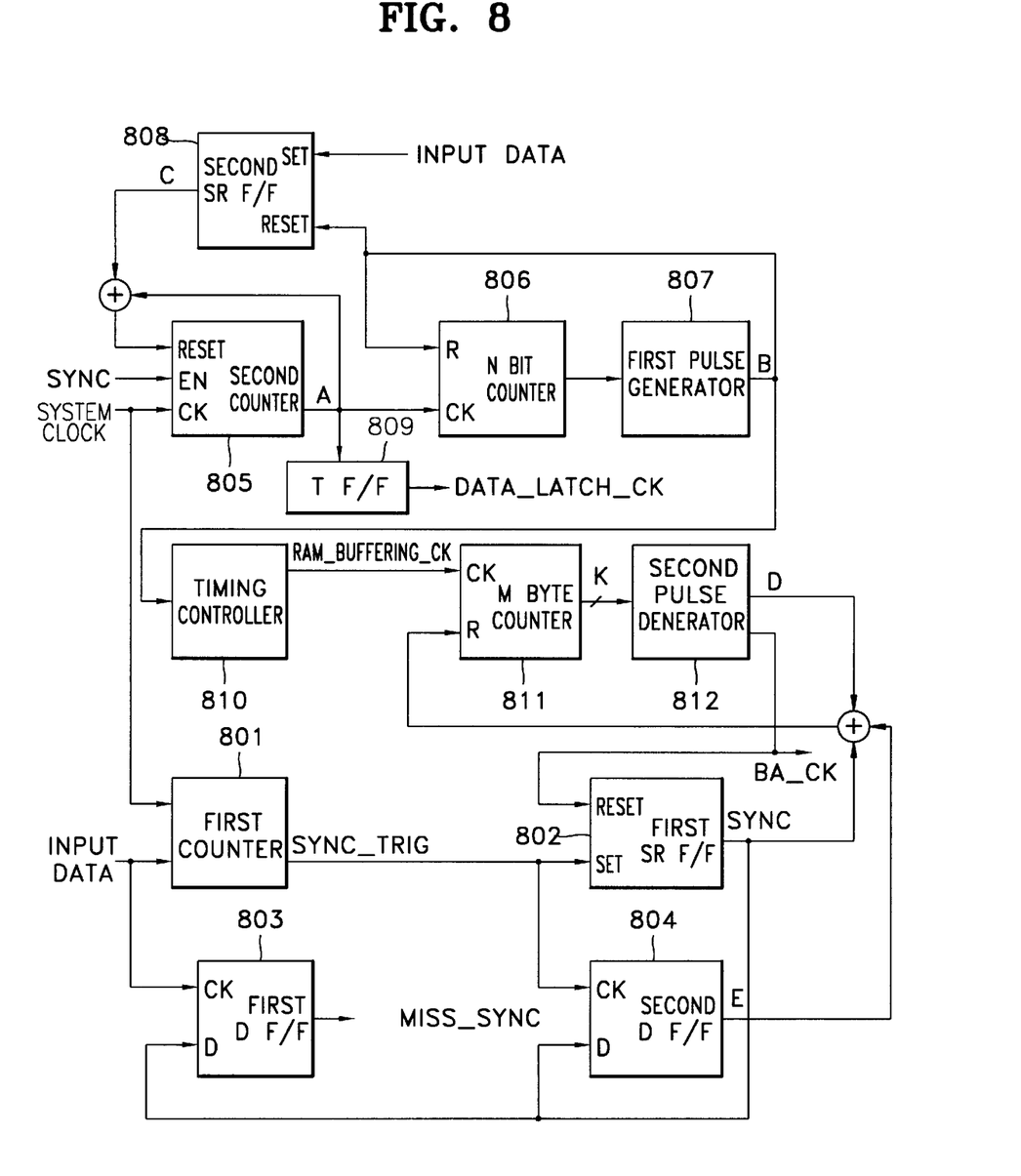
FIG. 8 shows an embodiment of the present invention for receiving serial data which does not have an additional sync signal.

FIG. 8 is a block diagram showing the composition of an apparatus for storing in memory the blocks of serial data transmitted in the format shown in FIG. 1C.

A first counter 801 counts the pulses of a system clock if the logic value of the input data is "low", and is reset if the logic value of the input data is "high". Furthermore, the first counter 801 generates a synchronizing trigger signal SYNC_TRIG pulse when the logic value of the input data is "low" for more than X $\mu$s. A first SR flip-flop 802 generates a sync signal SYNC when synchronizing trigger signal SYNC_TRIG is input to a SET terminal thereof and is reset by a block address clock signal BA_CK.

A first D flip-flop 803, having sync signal SYNC and the input data input to the data input terminal and the clock input terminal thereof, respectively, generates a miss sync signal MISS_SYNC when sync signal SYNC is detected at a rising edge of the input data signal. Miss sync signal MISS_SYNC is described with reference to FIGS. 9A through 9G.

Sync signal SYNC goes to a logic "high" state after an interval of X $\mu$s from the initial transferring time of the input data. If the first rising edge of the input data signal is input to the clock terminal of first D flip-flop 803 while sync signal SYNC is in a logic "low" state, the indication is that the initial logic "low" section of the input data is smaller than X $\mu$s, indicating that the sync signal is not detected. Therefore, miss sync signal MISS_SYNC is changed from a logic "high" state to a logic "low" state at the rising edge of the input data. However, if the rising edge of the input data signal is input during the logic "high" state of sync signal SYNC, then miss sync signal MISS_SYNC remains at a logic "high" state since the sync signal is correctly detected.

Sync signal SYNC and synchronizing trigger signal SYNC_TRIG are input to the data input terminal and clock input terminal, respectively, of a second D flip-flop 804, which asserts a signal E in a logic "high" state when SYNC_TRIG is generated while sync signal SYNC is in a logic "high" state, indicating an incorrect SYNC detection. Signal E is input to an adder and the output of the adder is input to the reset terminal R of an M byte counter 811 which is thereby reset.

A second counter 805, which is enabled when sync signal SYNC is in a logic "high" state, counts the system clock, generates a signal A which is a pulse signal having a duration of Y $\mu$s (the length of one byte of data is 2*Y $\mu$s), and is reset according to the sum of signal A and a signal C. A T-flip-flop 809 divides the frequency of signal A by two and generates a data latch clock signal DATA_LATCH_CK which is output to an external data latch (not shown). The data latch outputs the input data to a second SR flip-flop 808, and triggers and latches the input data at the rising edge of the data latch clock signal DATA_LATCH_CK.

An N bit counter 806 generates a control signal when the number of pulses of signal A is N. A first pulse generator 807 generates a pulse signal B every N bit units based on the control signal of N bit counter 806. Signal B resets N bit counter 806 and second SR flip-flop 808. The input data of N bits latched in the data latch (not shown) based on data latch clock signal DATA_LATCH_CK is converted into parallel data in a series-to-parallel converter (not shown) according to signal B.

A timing controller 810 generates a RAM buffering clock signal RAM_BUFFERING_CK so the serial data can be recorded at a time when other kinds of data are not being recorded, in order to prevent a data collision when various kinds of data are recorded in memory. The clock signal has the same phase as signal B. The above parallel data is recorded in memory during the logic "high" period and the output value of the M byte counter 811 increases by one at the falling edge of the clock signal.

RAM buffering clock signal RAM_BUFFERING_CK is input to the clock terminal of M byte counter 811. The output value of M byte counter 811 is used as a memory address. M byte counter 811 is reset by a signal D, signal E, and sync signal SYNC. A second pulse generator 812 generates signal D as a pulse signal when the output value of M byte counter 811 is M. Also, second pulse generator 812 generates block address clock signal BA_CK which is input to the reset terminal of first SR flip-flop 812 and lowers sync signal SYNC to a logic "low" state. Block address clock signal BA_CK is counted by a counter (not shown), and the counted value is used as the block address.

Second SR flip-flop 808 cancels the reset state of second counter 805 by asserting output signal C as a logic "high" state at the rising edge of the input data, and resets second counter 805 by asserting a logic "low" signal C whenever signal B indicates the transfer of the N bit data is complete.

The signals related to the operation of the apparatus shown in FIG. 8 are described as follows.

Synchronizing trigger signal SYNC_TRIG is generated when the input data is in a logic "low" state for more than X μs. Sync signal SYNC is changed to a logic "high" state at the rising edge of synchronizing trigger signal SYNC_TRIG, and is changed to a logic "low" state at the rising edge of block address clock signal BA_CK.

Miss sync signal MISS_SYNC is obtained by latching sync signal SYNC at the rising edge of the input data, and is in a logic "high" state during normal operation. Also, when sync signal SYNC is detected while miss sync signal MISS_SYNC is in a logic "low" state, it means that the logic "low" section of the input data is shorter than X μs and that the input data is not really a sync signal.

Signal E is obtained by latching sync signal SYNC at the rising edge of synchronizing trigger signal SYNC_TRIG, and is in a logic "low" state during normal operation and a logic "high" state during abnormal operation.

Signal A is generated at intervals of Y μs while sync signal SYNC is in the logic "high" state. Data latch clock DATA_LATCH_CK is obtained by dividing the frequency of signal A by two, and is the clock signal for enabling the data latch (not shown) to trigger and latch the transferred input data. Signal B is the pulse signal generated after every N pulses of signal A, which corresponds to every N bits of data. Signal C resets second counter 805 and maintains the reset state until the rising edge of the next input data is transferred, at the completion of the transfer of the N bits of data.

RAM buffering clock signal RAM_BUFFERING_CK is used during buffering of the input data transferred to memory, and generates a pulse after every N bits of data, with the same phase as that of signal B.

Block address clock signal BA_CK indicates that the transfer of M bytes of the input data has been completed. Signal D is in a logic "low" state when the output value of M byte counter 811 is M, and aids in resetting M byte counter 811.

Figure 9A:
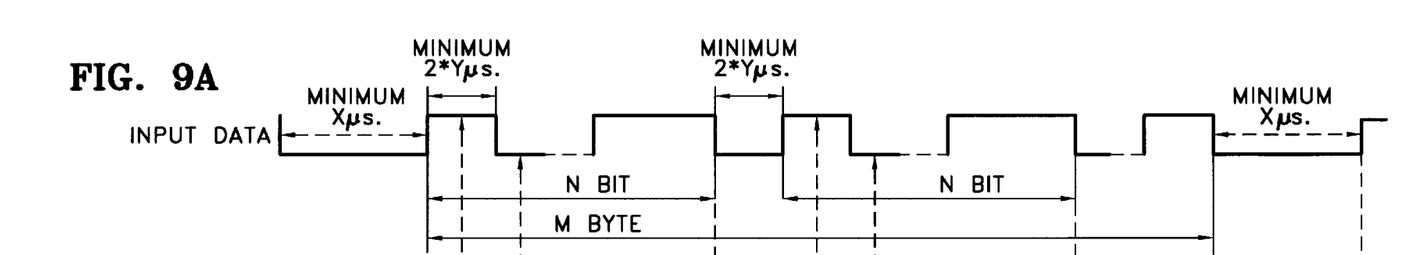
FIGS. 9A through 9G show waveforms of signals of the apparatus shown in FIG. 8.
Figure 9B:
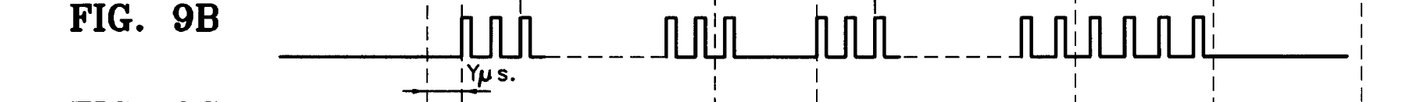
Figure 9C:
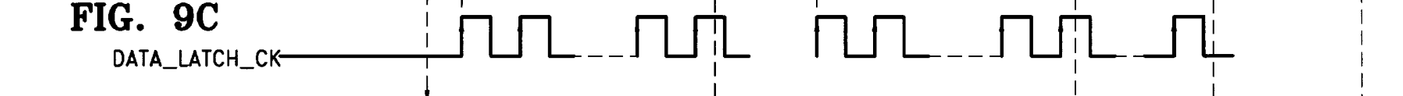
Figure 9D:
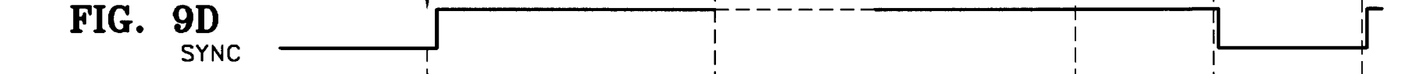
Figure 9E:
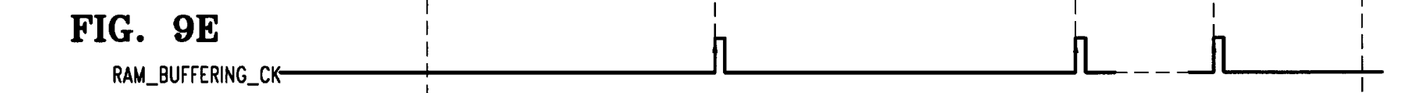
Figure 9F:
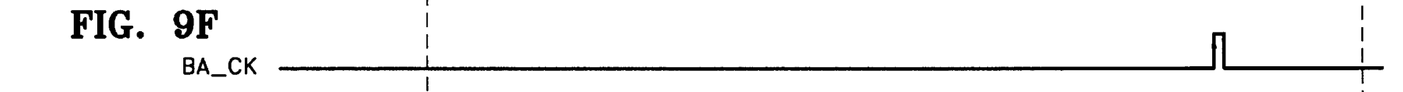
Figure 9G:
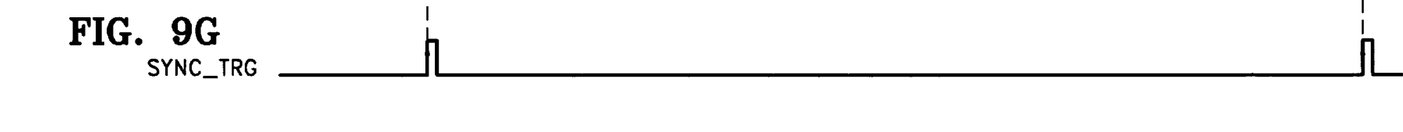

FIGS. 9A through 9G show waveforms of some of the abovementioned signals. These are the input data (FIG. 9A), signal A (FIG. 9B), data latch clock signal DATA_LATCH_CK (FIG. 9C), sync signal SYNC (FIG. 9D), RAM buffering clock signal RAM_BUFFERING_CK (FIG. 9E), block address clock signal BA_CK (FIG. 9F), and synchronizing trigger signal SYNC_TRIG (FIG. 9G).

The operation of the apparatus according to the present invention is described with reference to FIGS. 8 and 9A through 9G.

When sync signal SYNC is detected, second counter 805 is enabled. Second counter 805 generates signal A after being reset and counting as much as Y As, and an apparatus for storing the data in memory is triggered by the rising edge of data latch clock signal DATA_LATCH_CK which is obtained by dividing the frequency of signal A by two. The serial data of N bits is converted to parallel data at the output signal B of first pulse generator 807. In general, since other types of data are also recorded in memory, RAM buffering clock signal RAM_BUFFERING_CK is generated to control the timing of the data. RAM buffering clock signal RAM_BUFFERING_CK has the same phase as that of signal B, allows the data to be recorded in memory in the logic "high" state, and increments the count value of M byte counter 811 at falling edges. The count value of M byte counter 811 is used as the memory address. M byte counter 811 has a K-bit output signal of a size sufficient for expressing M as binary number. For example, if M is 16, K is at least 4. Second counter 805 is kept reset until the first rising edge of the next N bits which occurs after sync signal SYNC is detected and all the N bits of data are input. When the rising edge is input, second counter 805 resumes counting. When M bytes of serial data have been input, sync signal SYNC is changed to the logic "low" state by block address clock signal BA_CK which is output by second pulse generator 812. Block address clock signal BA_CK is used as the block address in memory and indicates that the transferal of the data block (M bytes) is complete.

According to the above-mentioned embodiment of the present invention, it is possible to prevent data from being lost and to store the data in memory, even when the sync signal is damaged by noise in the input data, by counting the number of symbols of transmitted data, generating signals corresponding thereto, and generating a proper block address.

It is possible to effectively use memory space, by sequentially increasing block addresses and minimizing unused areas of memory, even in the case of track jump.

Finally, it is possible to receive and store in memory serial data that does not include embedded sync signals, in a manner that prevents errors and uses simple hardware without a data clock, by generating a sync signal, a data latch signal, and a memory address signal from the serially transmitted data.

What is claimed is:

1. An apparatus for receiving serially transmitted data blocks wherein each data block includes a sync signal, a block address code, and object data, said apparatus comprising:

an input data reader that asserts a first signal when said sync signal is detected in a serially transmitted data block, stores as a first block address the block address code from a first transmitted data block, and stores as a second block address the block address code from a second transmitted data block that is subsequently received;

a signal generator which counts received symbols of serially transmitted data and asserts a second signal when a first count reaches a number of symbols in one complete block of data; and a block address output generator which increments a second count whenever said first signal or said second signal is asserted, replaces said second count with said second block address if said second block address is determined to be valid, and generates a block address that corresponds to said second count and identifies a memory block for storage of received object data.

2. The apparatus of claim 1 wherein said serially transmitted data block further includes an error code, wherein said input data reader comprises:

a first signal generator which asserts said first signal when said sync signal is detected in said serially transmitted data block;

a block address latch which stores said first block address and said second block address; and a tester which examines a portion of said serial transmitted data block including said block address code using said error code to determined whether the portion examined contains an error.

3. The apparatus of claim 2 wherein said block address output generator comprises:
- a clock signal generator which generates a clock signal whenever said first or second signal is asserted;
- a block address counter which increases or decreases a block address count by one whenever said clock signal is input;
- a block address selector which replaces said block address count with said second block address if said first block address was not the same as said block address count prior to receipt of said second transmitted data block, the difference between said second block address and said first block address is equal to one, and said tester does not indicate an error for said second transmitted data block.

4. An apparatus for receiving serially transmitted data blocks wherein each block includes a sync signal and object data, said apparatus comprising:
- a sync signal detector which asserts a signal D_SYNC when said sync signal is detected in said serial data;
- a byte clock pulse generator which generates a byte clock pulse for each byte of said serial data;
- a byte counter which counts said byte clock pulses and asserts a signal I_SYNC when a count of said byte clock pulses is equal to a predetermined number of bytes which constitute one data block;
- a writing address counter which counts said byte clock pulses starting from an initial writing address and generates a writing address value;
- a sync signal selector which receives said signal D_SYNC and said signal I_SYNC, asserts a signal A_SYNC by selecting either said signal D_SYNC or said signal I_SYNC according to a sync select enable signal, and resets said byte counter and said writing address counter with said signal A_SYNC;
- a block address counter which counts said signal A_SYNC starting from an initial block address and generates a block address value; and
- a controller which asserts said sync select enable signal corresponding to the applied command and generates said initial block address and said initial writing address.

5. The apparatus of claim 4, further comprising a sync state flag generator which receives said signal D_SYNC, said signal I_SYNC, and said select enable signal, and generates an enable signal for enabling said byte clock pulse generator in a predetermined mode.

6. The apparatus of claim 3, wherein the block address counter is reset when a head switching signal is received.

7. The apparatus of claim 1, wherein said second signal is a synchronizing signal that is replaces said first signal when said input data reader fails to detect said sync signal in a serially transmitted data block.

8. The apparatus of claim 7, further comprising a sync signal selector that for each serially transmitted data block, selects one of said first and second signals as a synchronizing signal for said serially transmitted data block.

9. A method for receiving serially transmitted data blocks wherein each data block includes a sync pattern, a block address code, and object data, the method comprising:
- asserting a first sync signal each time the sync pattern is detected in serially transmitted data blocks;
- counting received symbols of serially transmitted data to generate a first count;
- asserting a second sync signal when the first count reaches a number of symbols in one complete data block;
- incrementing a second count whenever the first sync signal or the second sync signal is asserted;
- replacing the second count with a block addresses from the block address code from a first transmitted data block, if the block address is determined to be valid; and
- generating an output block address that corresponds to said second count and identifies a memory block for storage of received object data.

10. The method of claim 9, wherein each serially transmitted data block further includes an error code, and the method further comprising examining a portion of each serial transmitted data block including the block address code and the error code to determined whether the block address is valid.

11. The method of claim 10, further comprising:
- failing to detect the sync patterning in a first serial transmitted data block; and
- using the second sync signal a sync signal for the first serial transmitted data block.

* * * * *